US012563381B2

(12) United States Patent
Gupta

(10) Patent No.: US 12,563,381 B2
(45) Date of Patent: Feb. 24, 2026

(54) METHOD OF MANAGING SUBSCRIBER IDENTITY MODULE (SIM) APPLICATION AND SYSTEM FOR USING THE SAME

(71) Applicant: RAKUTEN SYMPHONY, INC., Tokyo (JP)

(72) Inventor: Ashutosh Gupta, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 340 days.

(21) Appl. No.: 18/258,212

(22) PCT Filed: Jan. 31, 2023

(86) PCT No.: PCT/US2023/012044
§ 371 (c)(1),
(2) Date: Jun. 19, 2023

(87) PCT Pub. No.: WO2024/162960
PCT Pub. Date: Aug. 8, 2024

(65) Prior Publication Data
US 2024/0381069 A1 Nov. 14, 2024

(51) Int. Cl.
*H04W 8/00* (2009.01)
*H04W 4/60* (2018.01)
*H04W 8/18* (2009.01)
*H04W 8/20* (2009.01)

(52) U.S. Cl.
CPC ............. *H04W 8/183* (2013.01); *H04W 4/60* (2018.02); *H04W 8/20* (2013.01)

(58) Field of Classification Search
CPC ......... H04W 8/183; H04W 8/20; H04W 4/60; H04W 455/419
See application file for complete search history.

(56) References Cited

U.S. PATENT DOCUMENTS

| | | | |
|---|---|---|---|
| 8,132,260 B1 | 3/2012 | Mayer et al. | |
| 9,357,378 B1 * | 5/2016 | Delker | H04W 4/60 |
| 10,880,711 B1 * | 12/2020 | Holmes | H04L 67/30 |
| 2008/0082181 A1 | 4/2008 | Miller et al. | |
| 2018/0041855 A1 * | 2/2018 | Chen | H04L 63/0853 |
| 2023/0308855 A1 * | 9/2023 | Matolia | H04W 8/183 |
| 2024/0224021 A1 * | 7/2024 | An | H04W 8/205 |

FOREIGN PATENT DOCUMENTS

WO WO-2018219490 A1 * 12/2018 ............ H04W 12/35

* cited by examiner

*Primary Examiner* — Khai M Nguyen
(74) *Attorney, Agent, or Firm* — HAUPTMAN HAM, LLP

(57) ABSTRACT

A Subscriber Identity Module (SIM) application management system includes a non-transitory computer readable medium configured to store instructions thereon; and a processor connected to the non-transitory computer readable medium. The processor is configured to execute the instructions for: receiving a SIM application from a SIM application provider, obtaining a subscriber list including at least one subscriber from a mobile network operator; receiving an instruction directly from the SIM application provider; and customizing a SIM card of a mobile device associated with the at least one subscriber with the SIM application according to the instruction.

20 Claims, 3 Drawing Sheets

METHOD OF MANAGING SUBSCRIBER IDENTITY MODULE (SIM) APPLICATION AND SYSTEM FOR USING THE SAME

RELATED APPLICATIONS

The present application is a National Phase of International Application No. PCT/US2023/012044, filed Jan. 31, 2023.

TECHNICAL FIELD

This description relates to a method of managing Subscriber Identity Module (SIM) applications and a system for using the same.

BACKGROUND

In the telecommunication industry, a Subscriber Identity Module (SIM) card is installed into a mobile device for operation. Two types of the SIM cards are currently used in the market, i.e., physical SIM cards and eSIM (embedded SIM) cards. Each type of the SIM cards stores SIM applications developed by SIM application providers. Generally, the SIM application providers provide SIM applications to a mobile network operator, i.e., a wireless service provider, and the mobile network operator loads the SIM applications to physical SIM cards or eSIM cards. In other words, the mobile network operator has the responsibility to install SIM applications developed by the SIM application provider on a SIM card.

SUMMARY

In some embodiments, a Subscriber Identity Module (SIM) application management system includes a non-transitory computer readable medium configured to store instructions thereon. The system further includes a processor connected to the non-transitory computer readable medium. The processor is configured to execute the instructions for receiving a SIM application from a SIM application provider. The processor is further configured to execute the instructions for obtaining a subscriber list including at least one subscriber from a mobile network operator. The processor is further configured to execute the instructions for receiving an instruction directly from the SIM application provider. The processor is further configured to execute the instructions for customizing a SIM card of a mobile device associated with the at least one subscriber with the SIM application according to the instruction.

In some embodiments, a Subscriber Identity Module (SIM) application management method includes receiving a SIM application from a SIM application provider. The method further includes obtaining a subscriber list including at least one subscriber from a mobile network operator. The method further includes receiving an instruction directly from the SIM application provider. The method further includes customizing a SIM card of a mobile device associated with the at least one subscriber with the SIM application according to the instruction.

In some embodiments, a non-transitory computer readable medium configured to store instructions for causing a processor executing the instructions to implement a Subscriber Identity Module (SIM) application management method. The instructions cause the processor to receive a SIM application from a SIM application provider. The instructions further cause the processor to obtain a subscriber list including at least one subscriber from a mobile network operator. The instructions further cause the processor to receive an instruction directly from the SIM application provider. The instructions further cause the processor to customize a SIM card of a mobile device associated with the at least one subscriber with the SIM application according to the instruction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
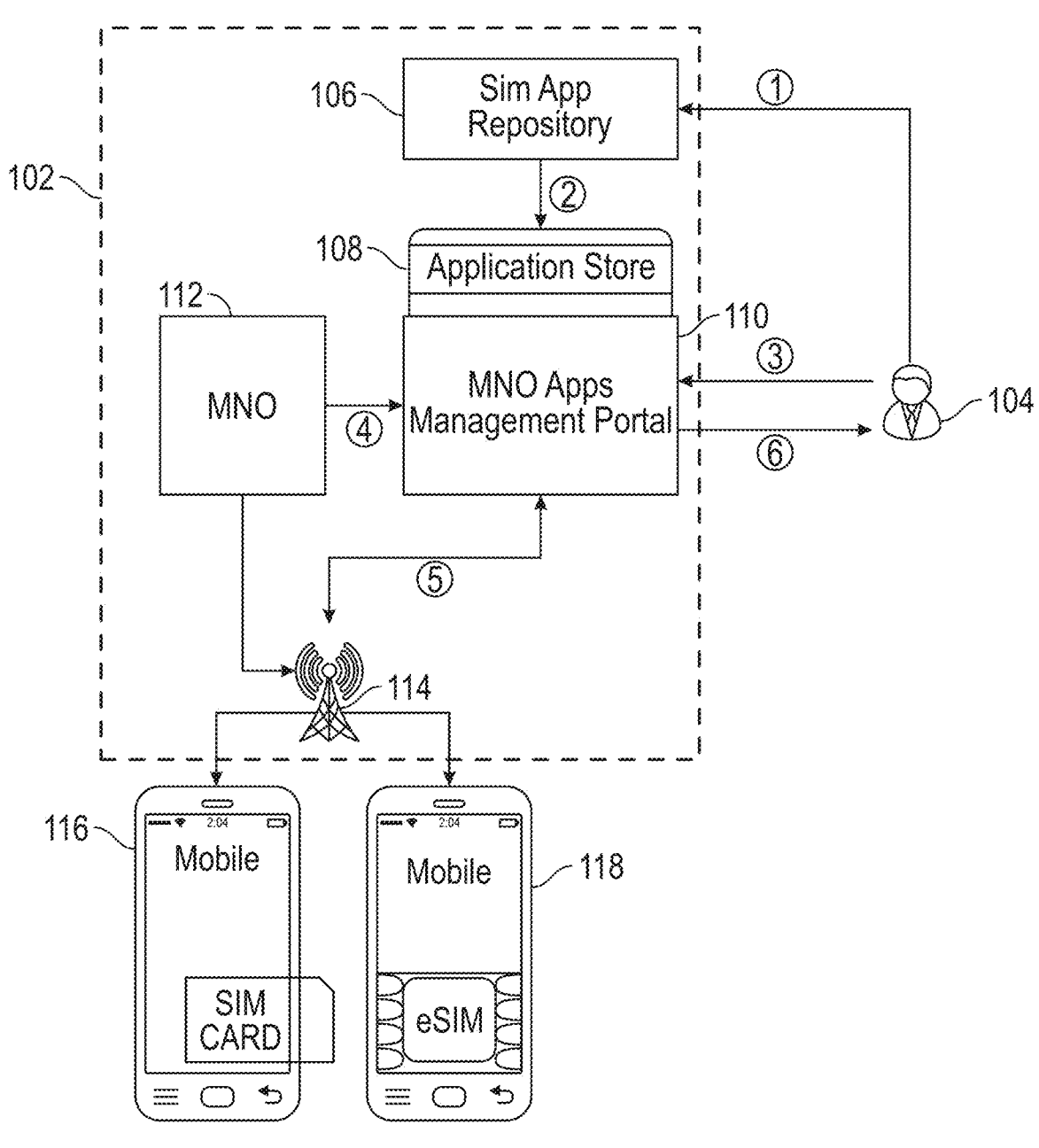
FIG. 1 is a schematic diagram of a SIM application management system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In telecommunication industry, a SIM application is loaded to a SIM card of a mobile device through a customization process. A customization process of a physical SIM card generally includes the following stages. At a first stage, a mobile network operator shares SIM File Specs which contains in-depth information of an existing file system with a SIM card vendor. The SIM vendor performs developing, manufacturing, testing, and packaging of Integrated Circuit (IC) chips, SIM product finishing processing, and development of SIM Operation System software. At a second stage, the SIM Operation System software is loaded into a personalization center of the SIM card vendor. At a third stage, the mobile network operator sends profiles including International Mobile Subscriber Identity (IMSI), Integrated Circuit Card Identification Number (ICCID), Mobile Station Integrated Services Digital Network (MSISDN), etc., to the personalization center, and the personalization center outputs network keys and Over the Air (OTA) keys to the mobile network operator in a secured format. At a fourth stage, the mobile network operator provisions the IMSI and network keys in a Home Location Register (HLR). At a fifth stage, the mobile network operator customizes the physical SIM card via an OTA server.

A customization process for an eSIM card is different from the customization process of a physical SIM card. The customization process of an eSIM card includes the following stages. At a first stage, an Embedded Universal Integrated Circuit Card (eUICC) is personalized with certificates and assembled in a mobile device. At a second stage, Subscription Manager Data Preparation (SMDP) is provided with a SIM card file system to create a SIM profile template. At a third stage, the SIM profile template is provided to a personalization center of SMDP. At a fourth stage, the mobile network operator provides all subscriber-related information such as IMSI, ICCID, MSISDN, etc. At a fifth stage, the SIM profile template is personalized with the subscriber-related information and stored in a profile inventory in SMDP. At a sixth stage, the personalization center outputs a network key, an OTA key, and an application key to the mobile network operator for provision in HLR at a seventh stage. At an eighth stage, a profile booking process is performed, e.g., by es2+ interface. At a ninth stage, the mobile network operator orders the SIM profile and at a tenth stage the mobile network operator generates a QR code and provides to a subscriber. When the subscriber scans the QR code by a mobile device, the SIM profile is downloaded to the eSIM card of the mobile device. At a final stage, the mobile network operator customizes the physical SIM card via an OTA server.

As explained above, the customization process of the physical SIM cards or eSIM cards with SIM applications is complicated. In the customization process, SIM application providers provide SIM application files to the mobile network operator for customization of a SIM card but the SIM application providers do not have the authority to control the SIM application structure inside a SIM memory of the SIM card. The mobile network provider has the control to perform customization of the SIM card with the SIM application(s). Thus, because the SIM application files, i.e., SIM applets binaries, are provided by the mobile network provider, testing of these SIM application files becomes very complicated by SIM application provider. Further, the SIM application providers face a situation that the SIM applications are installed to a large number of SIM cards but the number of active subscribers for the SIM applications is low. Thus, the SIM application providers spend a large amount of money on customizing SIM cards with the SIM applications that are not being actively used. As a result, storage space in the SIM cards is consumed without providing services that the mobile device user utilizes in many instances.

In some embodiments, a Subscriber Identity Module (SIM) application management system is provided for a SIM application provider to select a number of subscribers, customize a SIM card of a mobile device associated with the subscribers, and control the SIM application in the SIM card. This system helps to decrease storage of unused applications on the SIM cards. This system also helps to reduce fees to the SIM application providers by limiting the SIM cards being customized to only users or subscribers that are likely to utilize the SIM application. This in turn provides the users or subscribers with more opportunity to improve the efficiency of the SIM card storage in mobile devices based on the desires and preferences of the users or subscribers.

FIG. 1 is a schematic diagram of a SIM application management system in accordance with some embodiments. The SIM application management system 100 is implemented using a mobile network 102. In some embodiments, the SIM application management system 100 is implemented in multiple different mobile networks. The SIM application management system 100 receives or exchanges data with a SIM application provider 104 and a mobile network operator 112 via the mobile network 102.

The SIM application provider 104 develops a SIM application for a SIM card. In the present disclosure, the "SIM" card is understood to refer to a physical SIM card or an eSIM card. In some embodiments, the SIM application provider 104 develops more than one SIM applications. In some embodiments, the SIM application provider 104 refers to more than one SIM application providers. The SIM application provider 104 develops different types of SIM applications, such as SIM Toolkit Applications, Banking Applications, and Transit applications. Examples of the SIM Toolkit Applications include, but not limited to, NTMI (Network Triggered Multi IMSI), Celltick LiveScreen 16.1, NUTos (Native UICC Telecom O.S.), Smart Monitoring, Phone Book Application, Generic OTA Poller for IOT Devices, ARA-M/ARA-C, HTTPs Call Back Applet, IMEI Tracker, Dual IMSI, Smart Roaming, Launch URL, WIB Plugin-OTKENCR, IMEI Locker, Secure bank OTP, Static STK, Multi-lingual Dynamic STK, QoS (Quality of Service), etc. Examples of the Banking Applications include, but not limited to, Mastercard Pay Pass, Visa Pay Pass, etc. Examples of the Transit Applications include, but not limited to, Bus Application, Metro Rail Payment application, etc.

In some embodiments, the SIM application management system 100 includes a SIM application repository 106, a SIM application store 108, a SIM application management portal 110, and an Over-the-Air (OTA) server 114. In some embodiments, the SIM application management system 100 performs a SIM application management cycle including stages 1-6 which are described below.

At stage 1 of the SIM application management cycle, the SIM application provider 104 provides or uploads a SIM application file of a SIM application to a SIM application repository 106. The SIM application repository 106 is controllable or manageable by a processor or a hardware. The SIM application repository 106 receives and collects one or more SIM application files from the SIM application provider 104. In some embodiments, the SIM application file includes SIM Applet CAP (Compiled Applet) file. In some embodiments, the SIM application file include other file formats. In some embodiments, in a case that a SIM application is a banking application, the banking application provider creates a security domain in the application file of the banking application.

At stage 2 of the SIM application management cycle, a testing of the application file in the SIM application repository 106 is performed to determine whether the SIM application satisfies a predetermined requirement. In some embodiments, the testing is performed based on Java Card Standard. In some embodiments, the testing is performed based on a different computer programming standard. In some embodiments, the testing is automatically performed in response to the SIM application repository 106 receives the SIM application file. In some embodiments, the testing is performed in response to receiving a request or command via a network.

In some embodiments, a result of the testing of the application file indicates whether the SIM application received from the SIM application provider 104 is compatible with a SIM card issued by the mobile network operator 112. In some embodiments, a testing is performed to determine whether a SIM card issued by the mobile network operator 112 has a sufficient memory for customizing the SIM card with the SIM application provided by the SIM application provider 104. In response to determining the SIM application not compatible with the SIM card issued by the mobile network operator, for example, the size of the SIM application file exceeds the memory of the SIM card or the memory allowed for the SIM application, a notification is provided to the SIM application provider 104. In such a case, the SIM application provider 104 revises the SIM application file and uploads the revised SIM application file to the SIM application repository 106 again. In response to determining the SIM application being compatible with the SIM card issued by the mobile network operator, the SIM application file is moved to a SIM application store 108. The SIM application store 108 stores every SIM application that satisfies with a predetermined requirement or standard. The SIM application store 108 is accessible by the SIM application provider 104 via a network.

Further at stage 2 of the SIM application management cycle, the SIM application management system 100 links the SIM application moved to the SIM application store 108 to a corresponding SIM application provider 104. In such a case, the corresponding SIM application provider 104 is able to access to the SIM application for customization in a later stage. In some embodiments, an identification code/number is generated to link the SIM application in the SIM application store to the corresponding SIM application provider. The identification code/number is transmitted by a transmitter to the SIM application provider 104.

The SIM application store 108 is included in the SIM application management portal 110 of the SIM application management system 100. The SIM application management portal 110 is an accessible and centralized platform for securely connect the SIM application provider 104, the mobile network operator 112, and the OTA platform 114 with content, data, applications, etc.

At stage 3 of the SIM application management cycle, the SIM application management portal 110 provides access to the SIM application provider 104. In some embodiments, the SIM application provider 104 sends an instruction directly to the SIM application management portal 110 for customizing a SIM card with the corresponding SIM application. In some embodiments, an instruction is sent indirectly from the SIM application provider 104 to the SIM application management portal 110. The SIM application management portal 110 generates and publish a customization instruction according to the instruction sent by the SIM application provider 104. In some embodiments, more than one customization instruction is generated according to more than instruction sent by the SIM application provider 104. In some embodiments, a plurality of customization instructions is generated based on corresponding instructions sent by a plurality of SIM application providers. In some embodiments, a plurality of customization instructions is generated automatically in response to the receipt of the instruction from the SIM application provider. In some embodiments, a review of the SIM application provider's instruction is performed before generating a customization instruction for further proceeding.

In some embodiments, a customization instruction instructs a customization process to begin. A customization process of a SIM card associates a SIM application with subscriber-specific information in the SIM card. In some embodiments, customization of a SIM card with the corresponding SIM application includes installing a SIM application in a memory of the SIM card. In some embodiments, installing a SIM application in a SIM card includes transferring data onto a SIM card module, such as loading an operation system, a program, etc. In some embodiments, installing a SIM application further includes creating necessary files in the memory of the SIM card. When a SIM application is installed in a SIM card, the SIM application can be opened and run in a mobile device equipped with the SIM card.

Further in some embodiments, customization of a SIM card with the corresponding SIM application includes personalizing the SIM application in the SIM card, for example, transferring data including subscriber-specific information onto a SIM card module. In some embodiments, subscriber-specific information includes information related to a subscriber's identity, such as name, address, telephone number, email address, and any information identifying a subscriber of a mobile network provider. In some embodiments, subscriber-specific information includes personal data related to a subscriber, such as telecommunication service usage details, call records, message records, and any information derived from a subscriber's use of telecommunication services.

At stage 4 the SIM application management cycle, a subscriber list including a plurality of subscribers with subscriber-specific information is fetched from a subscriber inventory list managed by the mobile network operator 112 and provided to the SIM application management portal 110. In some embodiments, a group of subscribers in the subscriber list is selected for customization via the SIM application management portal 110 according to an instruction from the SIM application provider 104. In some embodiments, the SIM application management portal 110 is able to select a particular group of subscribers that meets a predetermined requirement from the SIM application provider 104. For example, in a case that the SIM application provider 104 receives a subscriber's request for installing their SIM application on a SIM card associated with the subscriber, the SIM application management portal 110 is able to select the subscriber for SIM card customization with the SIM application according to an instruction from the SIM application provider 104. In some embodiments, after a selection of subscribers, the SIM application management portal 110 is accessible by the SIM application provider 104 to make modification to the selection.

At stage 5 the SIM application management cycle, each of customization instructions is generated in the SIM application management portal 110. The customization instruction specifies the SIM application and the selected subscribers for customization of SIM cards associated with the selected subscribers. The OTA server 114 receives each of the customization instructions. The OTA server 114 includes a processor and a non-transitory computer readable medium. The OTA server 114 further receives update information from the mobile network operator 112, such as Remote File Management (RFM) and Remote Application Management (RAM) updates, to a SIM card. In response to receiving the customization instruction(s) and update information from the mobile network operator 112, the OTA server 114 performs RAM/RFM update to customize a SIM card. In some embodiments, the OTA server 114 performs RAM/RFM update via Short Message Service Point to Point (SMS-PP) or http on UICC application in a SIM card. In some embodiments, the OTA server 114 creates SMS messages including a SCP 80 protocol message conforming to Global Platform Standard. FIG. 1 shows that customization of a physical SIM card 116 or an eSIM card 118 is performed via the updates by OTA server 114.

In some embodiments, customization is performed to a plurality of SIM cards with a same SIM application. In some embodiments, customization is performed to a SIM card with a plurality of different SIM applications.

Further at stage 5, the SIM application management portal 110 receives a status report from the OTA server 114. In some embodiments, the OTA server 114 generates a status report of the customization performed to the SIM card(s), e.g., physical SIM card 116 or eSIM card 118, and sends to the SIM application management portal 110 which is accessible by the SIM application provider 104 of the SIM application. In some embodiments, a status report is generated in response to an error occurred during the customization. In some embodiments, the SIM application provider 104 receives a notification or an alert when a status report is generated and published in the SIM application management portal 110. In some embodiments, a status report is transmitted by a transmitter to the SIM application provider 104.

At stage 6 the SIM application management cycle, in response to the customization of the SIM card(s) with a SIM application being completed, a completion report is generated in the SIM application management portal 110 and provided to the SIM application provider 104. In some embodiments, a completion report includes information such as the number of customized SIM cards, the information of the subscribers, completion date/time, an identification number identifying the SIM application. In some embodiments, in response to customization of a plurality of SIM card with a same SIM application being completed, a single completion report is generated and provided to the SIM application provider. In some embodiments, in response to customization of a SIM card with a plurality of SIM applications being completed, a plurality of corresponding completion reports is generated and provided to the corresponding SIM application providers.

In some embodiments, in a case that a SIM card is customized with a banking application including a security domain, a security domain personal key is generated by the SIM application management portal 110 and sent to the SIM application provider of the banking application. As a result, the SIM application provider has a secured control to the banking application installed in the SIM card associated with a subscriber by using the security domain personal key.

In accordance with some embodiments described in the disclosure, the SIM application management system receives a SIM card file of a SIM card application provided by a SIM application provider in a SIM application store, receives a subscriber list provided by a mobile network operator, and provides a SIM application management portal that collects the received SIM card application file and the subscriber list. The SIM application management portal selects at least one subscriber from the subscriber list to instruct an OTA server to customize a SIM application to a memory of a SIM card associated with the selected subscriber. As a result, the SIM application management system allows the SIM application provider to directly control the SIM application in the SIM card. The SIM application management system further allows the SIM application provider to control which user/subscriber to install the SIM application. By using the SIM application management system, the SIM application provider is only charged for the active subscriber who is using the SIM application such that a cost for customizing SIM cards is reduced. Further by using the SIM application management system, a mobile network operator, i.e., a wireless provider, is able to sell UICC/eUICC memory to a SIM application provider for loading and installing a SIM application according to Global Platform Standard. The SIM application management system provides control to the SIM application provider to customize the SIM card according to instructions/requirements of the mobile network operator.

Figure 2:
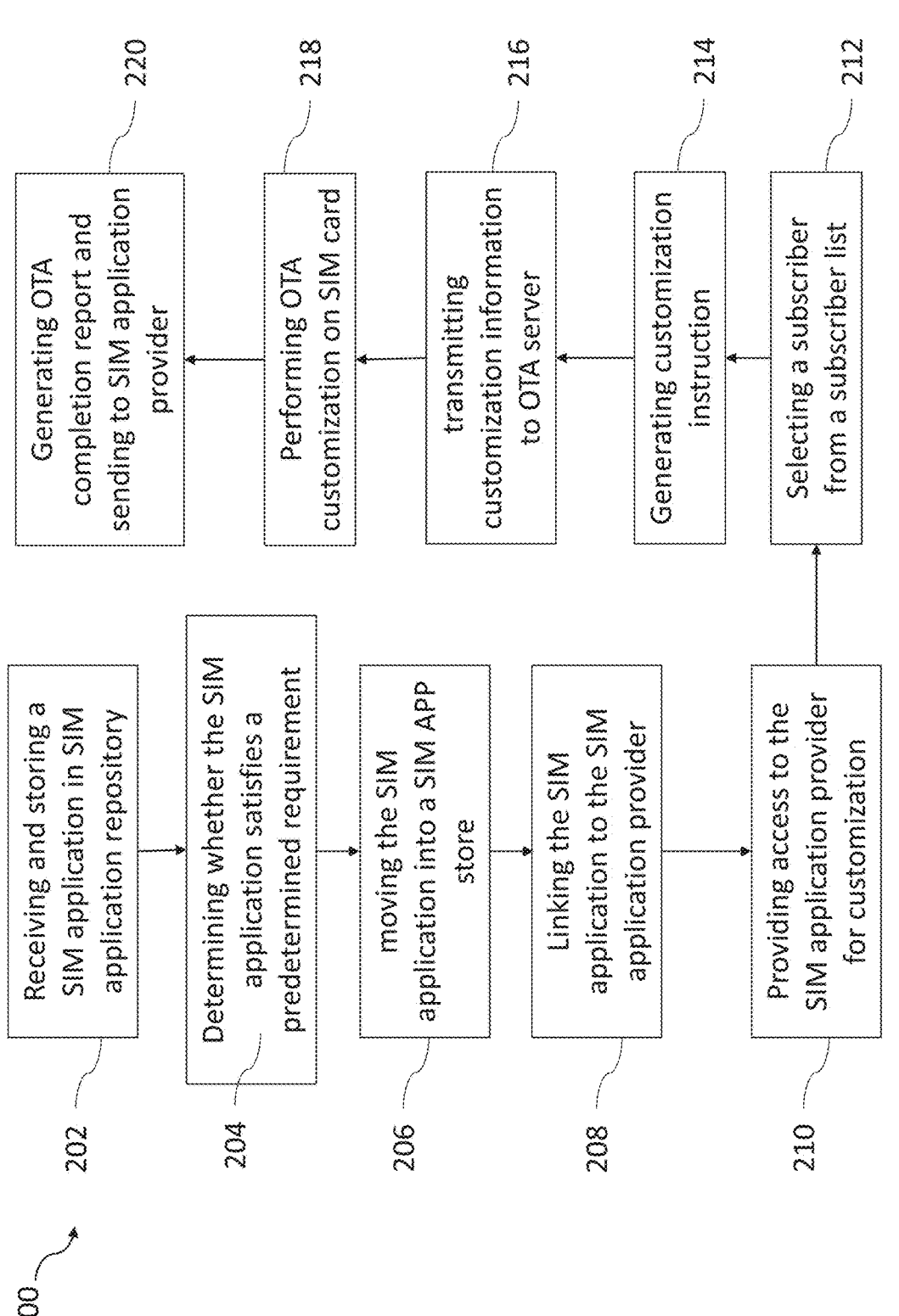
FIG. 2 is a flowchart of a method of managing SIM applications in accordance with some embodiments.

FIG. 2 is a flowchart of a method 200 of managing Subscriber Identity Module (SIM) applications in accordance with some embodiments. In some embodiments, the method 200 is implemented by the SIM application management system 100 (FIG. 1). In some embodiments, the method 200 is implemented by a SIM application management system different from the SIM application management system 100 (FIG. 1).

The method 200 includes operation 202 in which a SIM application file of a SIM application is received. In some embodiments, a SIM application file of a SIM application is received from the SIM application provider 104 (FIG. 1). In some embodiments, a plurality of SIM applications files of SIM applications is received from different SIM application providers. Further in operation 202, the SIM application file received from the SIM application provider is stored in a SIM application repository. In some embodiments, the SIM application file received from the SIM application provider is stored in the SIM application repository 106 (FIG. 1). In some embodiments, the SIM application file includes SIM Applet CAP (Compiled Applet) file. In some embodiments, the SIM application file includes other files. In some embodiments, in a case that a SIM application is a banking application, the banking application provider creates a security domain in the application file of the banking application. The application file including the security domain is received and stored in operation 202.

In response to receiving and storing the application file of the SIM application in operation 202, the method 200 proceeds to operation 204 in which a testing is performed to determine whether the SIM application satisfies a predetermined requirement. In some embodiments, the testing is performed based on Java Card Standard. In some embodiments, the testing is performed based on a different computer programming standard.

In some embodiments, the testing in operation 204 is performed automatically in response to the SIM application file being received in operation 202. In some embodiments, after the SIM application file is received in operation 202, the testing is performed in response to a request or a demand of testing being received.

In some embodiments, a result of the testing of the application file indicates whether the SIM application received from the SIM application provider 104 is compatible with a SIM card issued by a mobile network operator. In some embodiments, a testing is performed to determine whether a SIM card issued by a mobile network operator has a sufficient memory for storing the SIM application provided by the SIM application provider. In response to determining the SIM application not compatible with the SIM card issued by the mobile network operator, for example, the size of the SIM application file exceeds the memory of the SIM card, a notification is provided to the SIM application provider for revising the SIM application file. In such a case, operation 202 receives and stores the revised SIM application file for another testing. In response to determining the SIM application being compatible with the SIM card issued by the mobile network operator, the method 200 proceeds to operation 206 in which the SIM application file is moved or transferred to a SIM application store. In some embodiments, the SIM application file is moved or transferred to the SIM application store 108 (FIG. 1). The SIM application store stores every SIM application that satisfies with a predetermined requirement or standard. The SIM application store is accessible by one or more SIM application providers.

In response to the SIM application being transferred to the SIM application store in operation 206, the method 200 proceeds to operation 208 in which the SIM application in the SIM application store is linked to a corresponding SIM application provider. In some embodiments, an identification code/number is generated to link the SIM application provider to the corresponding SIM application in the SIM application store. In some embodiments, in a case that a plurality of SIM applications are received from a plurality of SIM application providers, each of the plurality of SIM applications is linked to a corresponding SIM application provider.

The method 200 further proceeds from operation 208 to operation 210. In operation 210, an access to a SIM application management portal is provided to the corresponding SIM application provider. In some embodiments, the SIM application provider is able to access to the SIM application management portal 110 (FIG. 1). The access enables the SIM application provider to directly control customization of a SIM card with their SIM application. In some embodiments, in operation 210, an instruction from the SIM application provider is received by the SIM application management portal for customizing a SIM card with the corresponding SIM application. Further in operation 210, a customization instruction is generated according to the instruction provided by the SIM application provider. In some embodiments, more than one customization instruction is generated.

In some embodiments, a customization instruction instructs a customization process to begin. A customization process of a SIM card associates a SIM application with subscriber-specific information in the SIM card. In some embodiments, customization of a SIM card with the corresponding SIM application includes installing a SIM application in a memory of the SIM card. In some embodiments, installing a SIM application in a SIM card includes transferring data onto a SIM card module, such as loading an operation system, a program, etc. In some embodiments, installing a SIM application further includes creating necessary files in the memory of the SIM card. When a SIM application is installed in a SIM card, the SIM application can be opened and run in a mobile device equipped with the SIM card.

Further in some embodiments, customization of a SIM card with the corresponding SIM application includes personalizing the SIM application in the SIM card, for example, transferring data including subscriber-specific information onto a SIM card module. In some embodiments, subscriber-specific information includes information related to a subscriber's identity, such as name, address, telephone number, email address, and any information identifying a subscriber of a mobile network provider. In some embodiments, subscriber-specific information includes personal data related to a subscriber, such as telecommunication service usage details, call records, message records, and any information derived from a subscriber's use of telecommunication services.

The method 200 further proceeds from operation 210 to operation 212 in which a subscriber is selected from a subscriber list for customization of a SIM card associated with the selected subscriber. The subscriber list includes a plurality of subscribers with subscriber-specific information. In some embodiments, the subscriber list is fetched from a subscriber inventory list managed by the mobile network operator 112 (FIG. 1) and stored in the SIM application management portal 110 (FIG. 1). In some embodiments, a group of subscribers in the subscriber list is selected for customization according to an instruction from the SIM application provider. In some embodiments, a particular group of subscribers that meets a predetermined requirement from the SIM application provider is selected in operation 212. For example, in a case that the SIM application provider receives a subscriber's request for installing their SIM application on a SIM card associated with the subscriber, the subscriber for SIM card customization with the SIM application is selected according to an instruction from the SIM application provider. The selection of subscribers is modifiable by the SIM application provider. In some embodiments, a modification to the selection of subscribers is implemented after an initial selection of subscribers.

In response to a subscriber being selected in operation 212, the method 200 proceeds to operation 214 in which a customization instruction is generated. In some embodiments, the customization instruction is generated in the SIM application management portal 110 (FIG. 1). The customization instruction specifies the SIM application and the selected subscribers for customization of SIM cards associated with the selected subscribers.

In response to the customization instruction being generated in operation 214, the method 200 proceeds to operation 216 in which customization information is transmitted to an OTA server. In some embodiment, the customization instruction is transmitted to the OTA server 114 (FIG. 1). In some embodiments, the customization information includes the customization instruction. In some embodiments, the customization information includes update information provided by a mobile network operation, for example the mobile network operator 112 (FIG. 1). The update information includes, but not limited to, Remote File Management (RFM) and Remote Application Management (RAM) updates.

The method 200 further proceeds from operation 216 to operation 218 in which OTA customization is performed on a SIM card associated with the selected subscriber. The customization is performed to a physical SIM card or an eSIM card. In some embodiments, RAM/RFM update is performed by the OTA server to customize the SIM card associated with the selected subscriber. In some embodiments, RAM/RFM update is performed via Short Message Service Point to Point (SMS-PP) or http on UICC application in a UICC card, i.e., a SIM card. In some embodiments, SMS messages including a SCP 80 protocol message conforming to Global Platform Standard are created for customization.

In operation 218, customization is performed to a plurality of SIM cards with a same SIM application in accordance with some embodiments. In operation 218, customization is performed to a SIM card with a plurality of different SIM applications provided by a plurality of SIM application providers in accordance with some embodiments.

In response to the customization being completed in operation 218, the method 200 further proceeds to operation 220 in which a completion report is generated and sent to the SIM application provider. In some embodiments, a completion report is generated in response to the customization, i.e., OTA updates, performed to the SIM card associated with the selected subscriber being completed. In some embodiments, a completion report is generated in response to the customization performed to all of SIM cards associated with the selected subscribers being completed. In some embodiments, a completion report includes information such as the number of customized SIM cards, the information of the subscribers, completion date/time, an identification number identifying the SIM application. In some embodiments, in response to customization of a plurality of SIM card with a same SIM application being completed, a single completion report is generated and provided to the SIM application provider. In some embodiments, in response to customization of a SIM card with a plurality of SIM applications being completed, a plurality of corresponding completion reports is generated and provided to the corresponding SIM application providers.

In some embodiments, in a case that a SIM card is customized with a banking application including a security domain, a security domain personal key is generated in operation 220 and sent to the SIM application provider of the banking application. As a result, the SIM application provider has a secured control to the banking application installed in the SIM card associated with a subscriber by using the security domain personal key.

One of ordinary skill in the art would understand that modifications to the method 200 are within the scope of this description. In some embodiments, at least one additional operation is included in the method 200. For example, in some embodiments, a status report of the customization to the SIM card with the SIM application is generated. In some embodiments, the OTA server generates the status report and sends to the SIM application management portal which is accessible by the SIM application provider of the SIM application. In some embodiments, the status report is generated in response to an error occurred during the customization. In some embodiments, the SIM application provider receives a notification or an alert when a status report is generated and published in the SIM application management portal. In some embodiments, at least one operation of the method 200 is omitted. For example, in some embodiments, selecting a subscriber in the operation 212 is omitted when customizing SIM cards associated with all subscribers in a subscriber inventory list is instructed by the SIM application provider. In some embodiments, an order of operations of the method 200 is adjusted. For example, in some embodiments, the operation 212 is performed prior to the operation 210.

Figure 3:
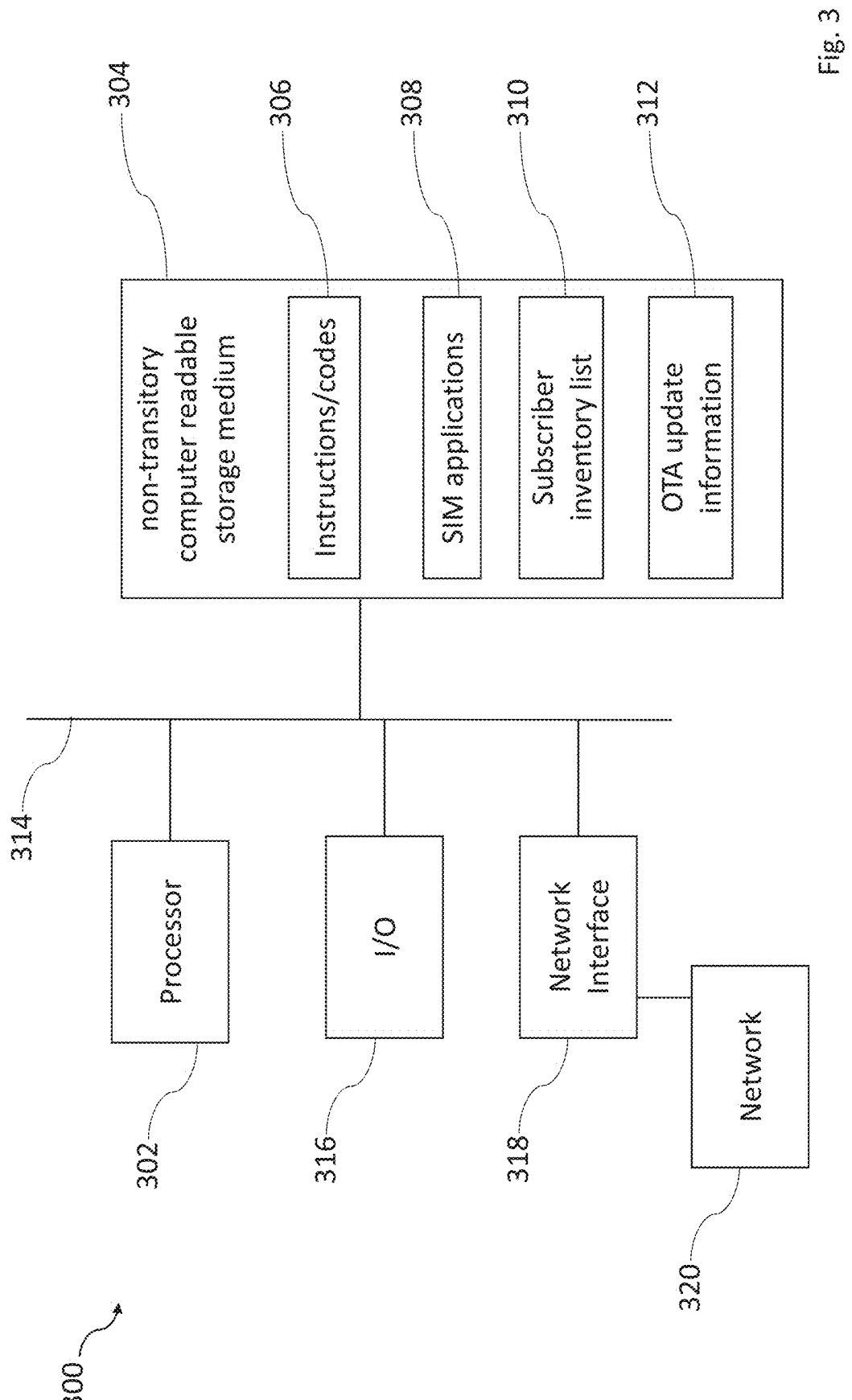
FIG. 3 is a block diagram of a system for managing SIM applications in accordance with some embodiments.

FIG. 3 is a block diagram of system 300 for managing a SIM application in accordance with some embodiments. System 300 includes a hardware processor 302 and a non-transitory computer readable storage medium 304 encoded with, i.e., storing, the computer program code 306, i.e., a set of executable instructions. The computer readable storage medium 304 also stores one or more SIM applications 308, subscriber inventory list 310, and OTA update information 312. The processor 302 is electrically coupled to the computer readable storage medium 304 via a bus 314. The processor 302 is also electrically coupled to an I/O interface 316 by bus 314. A network interface 318 is also electrically connected to the processor 302 via bus 314. The network interface 318 is connected to a network 320, so that processor 302 and computer readable storage medium 304 are capable of connecting to external elements via network 320. The processor 302 is configured to execute the computer program code 306 encoded in the computer readable storage medium 304 in order to cause system 300 to be usable for performing a portion or all of the operations as described in method 200 (FIG. 2).

In some embodiments, the processor 302 is a central processing unit (CPU), a multi-processor, a distributed processing system, an application specific integrated circuit (ASIC), and/or a suitable processing unit.

In some embodiments, the computer readable storage medium 304 is an electronic, magnetic, optical, electromagnetic, infrared, and/or a semiconductor system (or apparatus or device). For example, the computer readable storage medium 304 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 304 includes a compact disk-read only memory (CD-ROM), a compact disk-read/write (CD-R/W), and/or a digital video disc (DVD).

In some embodiments, the computer readable storage medium 304 stores the computer program code 306 configured to cause system 300 to perform a portion or all of the operations as described in method 200 (FIG. 2). In some embodiments, the computer readable storage medium 304 also stores information for performing a portion or all of the operations as described in method 200 (FIG. 2) as well as information generated during performing a portion or all of the operations as described in method 200 (FIG. 2).

In some embodiments, the computer readable storage medium 304 stores instructions 306 for interfacing with external devices. The instructions 306 enable processor 302 to generate and receive instructions readable by the external devices to effectively perform a portion or all of the operations as described in method 200 (FIG. 2).

System 300 includes I/O interface 316. I/O interface 316 is coupled to external circuitry. In some embodiments, I/O interface 316 includes a keyboard, keypad, mouse, trackball, trackpad, and/or cursor direction keys for communicating information and commands to processor 302.

System 300 also includes network interface 318 coupled to the processor 302. Network interface 318 allows system 300 to communicate with network 320, to which one or more other computer systems are connected. Network interface 318 includes wireless network interfaces such as BLU-ETOOTH, WIFI, WIMAX, GPRS, or WCDMA; or wired network interface such as ETHERNET, USB, or IEEE-1394. In some embodiments, method 200 (FIG. 2) is implemented in two or more systems 300, and information is exchanged between different systems 300 via network 314.

An aspect of this description relates to a system. The system includes a non-transitory computer readable medium configured to store instructions thereon. The system further includes a processor connected to the non-transitory computer readable medium. The processor is configured to execute the instructions for: receiving a SIM application from a SIM application provider; obtaining a subscriber list including at least one subscriber from a mobile network operator; receiving an instruction directly from the SIM application provider; and customizing a SIM card of a mobile device associated with the at least one subscriber with the SIM application according to the instruction. In some embodiments, the processor is further configured to execute the instructions for providing a portal directly controllable by the SIM application provider. In some embodiments, the SIM application includes a SIM application file, and the processor is further configured to execute the instructions for determining whether the SIM application file is compatible with a predetermined requirement. In some embodiments, the customizing the SIM card associated with the at least one subscriber with the SIM application includes installing the SIM application in a memory of the SIM card. In some embodiments, the customizing the SIM card associated with the at least one subscriber with the SIM application further includes personalizing the SIM application installed in the memory of the SIM card. In some embodiments, the processor is further configured to execute the instructions for generating a report of customization of the SIM card with the SIM application; and instructing a transmitter to transmit the report to the SIM application provider. In some embodiments, the processor is configured to execute the instructions for: selecting a group of subscribers from the subscribers in the subscriber list; and customizing a plurality of SIM cards with the SIM application, wherein each of the plurality of SIM cards is associated with a corresponding subscriber of the group of subscribers. In some embodiments, the processor is configured to execute the instructions for: receiving a plurality of SIM applications including the SIM application from a plurality of SIM application providers including the SIM application provider; and linking each of the plurality of SIM applications to a corresponding SIM application provider of the plurality of SIM application provider. In some embodiments, the processor is configured to execute the instructions for: receiving a plurality of instructions directly from the plurality of SIM application providers; and customizing the SIM card associated with the at least one subscriber with the plurality of SIM applications based on the plurality of instructions. In some embodiments, the processor is further configured to execute the instructions for: customizing the SIM card associated with the at least one subscriber with a banking application including a security domain; generating a security domain key for the banking application; and transmitting the security domain key to a banking application provider. An aspect of this description relates to a method. The method includes receiving a SIM application from a SIM application provider, obtaining a subscriber list including at least one subscriber from a mobile network operator; receiving an instruction directly from the SIM application provider; and customizing a SIM card of a mobile device associated with the at least one subscriber with the SIM application according to the instruction. In some embodiments, the method further includes providing a portal directly controllable by the SIM application provider. In some embodiments, the SIM application includes a SIM application file, and the method further includes determining whether the SIM application file is compatible with a predetermined requirement. In some embodiments, the customizing the SIM card associated with the at least one subscriber with the SIM application includes installing the SIM application in a memory of the SIM card. In some embodiments, the customizing the SIM card associated with the at least one subscriber with the SIM application further includes personalizing the SIM application installed in the memory of the SIM card. In some embodiments, the method further includes generating a report of customization of the SIM card with the SIM application; and transmitting the report to the SIM application provider. In some embodiments, the method further includes selecting a group of subscribers from the subscribers in the subscriber list; and customizing a plurality of SIM cards with the SIM application, wherein each of the plurality of SIM cards is associated with a corresponding subscriber of the group of subscribers. In some embodiments, the method further includes receiving a plurality of instructions directly from the plurality of SIM application providers; and customizing the SIM card associated with the at least one subscriber with the plurality of SIM applications based on the plurality of instructions.

An aspect of this description relates to a non-transitory computer readable medium configured to store instructions for causing a processor executing the instructions to implement a method. The instructions cause the processor to receive a SIM application from a SIM application provider. The instructions further cause the processor to receive a subscriber list including at least one subscriber from a mobile network operator. The instructions further cause the processor to receive an instruction directly from the SIM application provider. The instructions further cause the processor to customize a SIM card of a mobile device associated with the at least one subscriber with the SIM application according to the instruction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A Subscriber Identity Module (SIM) application management system, comprising:
   a non-transitory computer readable medium configured to store instructions thereon; and
   a processor connected to the non-transitory computer readable medium, wherein the processor is configured to execute the instructions for:
   receiving a SIM application from a SIM application provider;
   obtaining a subscriber list including at least one subscriber from a mobile network operator;
   receiving an instruction directly from the SIM application provider;
   customizing a SIM card of a mobile device associated with the at least one subscriber with the SIM application according to the instruction; and
   linking the SIM application to the SIM application provider.

2. The Subscriber Identity Module (SIM) application management system according to claim 1, wherein the processor is further configured to execute the instructions for providing a portal directly controllable by the SIM application provider.

3. The Subscriber Identity Module (SIM) application management system according to claim 1, wherein
   the SIM application includes a SIM application file, and
   the processor is further configured to execute the instructions for determining whether the SIM application file is compatible with a predetermined requirement.

4. The Subscriber Identity Module (SIM) application management system according to claim 1, wherein said customizing the SIM card associated with the at least one subscriber with the SIM application includes installing the SIM application in a memory of the SIM card.

5. The Subscriber Identity Module (SIM) application management system according to claim 4, wherein said customizing the SIM card associated with the at least one subscriber with the SIM application further includes personalizing the SIM application installed in the memory of the SIM card.

6. The Subscriber Identity Module (SIM) application management system according to claim 1, wherein the processor is further configured to execute the instructions for:

generating a report of customization of the SIM card with the SIM application; and instructing a transmitter to transmit the report to the SIM application provider.

7. The Subscriber Identity Module (SIM) application management system according to claim 1, wherein the processor is configured to execute the instructions for:

selecting a group of subscribers from the subscriber list; and customizing a plurality of SIM cards with the SIM application, wherein each of the plurality of SIM cards is associated with a corresponding subscriber of the group of subscribers.

8. The Subscriber Identity Module (SIM) application management system according to claim 1, wherein the processor is configured to execute the instructions for:

receiving a plurality of SIM applications, including the SIM application, from a plurality of SIM application providers, including the SIM application provider;

wherein linking the SIM application to the SIM application provider comprises linking each of the plurality of SIM applications to a corresponding SIM application provider of the plurality of SIM application provider.

9. The Subscriber Identity Module (SIM) application management system according to claim 8, wherein the processor is configured to execute the instructions for receiving a plurality of instructions directly from the plurality of SIM application providers; and customizing the SIM card associated with the at least one subscriber with the plurality of SIM applications based on the plurality of instructions.

10. The Subscriber Identity Module (SIM) application management system according to claim 1, wherein the processor is further configured to execute the instructions for:

customizing the SIM card associated with the at least one subscriber with a banking application including a security domain, generating a security domain key for the banking application, and instructing a transmitter to transmit the security domain key to a banking application provider.

11. A Subscriber Identity Module (SIM) application management method, comprising:

receiving a SIM application from a SIM application provider;

obtaining a subscriber list including at least one subscriber from a mobile network operator;

receiving an instruction directly from the SIM application provider;

customizing a SIM card of a mobile device associated with the at least one subscriber with the SIM application according to the instruction; and linking the SIM application to the SIM application provider.

12. The Subscriber Identity Module (SIM) application management method according to claim 11, further comprising: providing a portal directly controllable by the SIM application provider.

13. The Subscriber Identity Module (SIM) application management method according to claim 11, wherein the SIM application includes a SIM application file, and the method further comprising determining whether the SIM application file is compatible with a predetermined requirement.

14. The Subscriber Identity Module (SIM) application management method according to claim 11, wherein said customizing the SIM card associated with the at least one subscriber with the SIM application includes installing the SIM application in a memory of the SIM card.

15. The Subscriber Identity Module (SIM) application management method according to claim 14, wherein said customizing the SIM card associated with the at least one subscriber with the SIM application further includes personalizing the SIM application installed in the memory of the SIM card.

16. The Subscriber Identity Module (SIM) application management method according to claim 11, further comprising:

generating a report of customization of the SIM card with the SIM application; and instructing a transmitter to transmit the report to the SIM application provider.

17. The Subscriber Identity Module (SIM) application management method according to claim 11, further comprising:

selecting a group of subscribers from the subscriber list; and customizing a plurality of SIM cards with the SIM application, wherein each of the plurality of SIM cards is associated with a corresponding subscriber of the group of subscribers.

18. The Subscriber Identity Module (SIM) application management method according to claim 11, further comprising:

receiving a plurality of SIM applications including the SIM application from a plurality of SIM application providers including the SIM application provider;

wherein linking the SIM application to the SIM application provider comprises linking each of the plurality of SIM applications to a corresponding SIM application provider of the plurality of SIM application provider.

19. The Subscriber Identity Module (SIM) application management method according to claim 18, further comprising:

receiving a plurality of instructions directly from the plurality of SIM application providers; and customizing the SIM card associated with the at least one subscriber with the plurality of SIM applications based on the plurality of instructions.

20. A non-transitory computer readable medium configured to store instructions for causing a processor executing the instructions to implement a Subscriber Identity Module (SIM) application management method comprising:

receiving a SIM application from a SIM application provider;

obtaining a subscriber list including at least one subscriber from a mobile network operator;

receiving an instruction directly from the SIM application provider;

customizing a SIM card of a mobile device associated with the at least one subscriber with the SIM application according to the instruction; and linking the SIM application to the SIM application provider.

* * * * *